Feb. 16, 1937.  V. V. COLBY  2,070,885
CUTTING MACHINE
Filed Sept. 2, 1933   6 Sheets-Sheet 3

Inventor:
Vincent V. Colby.
By Brown, Jackson, Boettcher & Dienner,
Attys.

Feb. 16, 1937.   V. V. COLBY   2,070,885
CUTTING MACHINE
Filed Sept. 2, 1933   6 Sheets-Sheet 6

Inventor
Vincent V. Colby.
By Brown, Jackson, Boettcher & Dienner,
Attys.

Patented Feb. 16, 1937

2,070,885

UNITED STATES PATENT OFFICE 2,070,885

CUTTING MACHINE

Vincent V. Colby, Jemez Springs, N. Mex., assignor to International Register Company, Chicago, Ill., a corporation of Illinois Application September 2, 1933, Serial No. 687,937

9 Claims. (Cl. 164—75)

This invention relates to cutting machines, and has to do with a machine employing a reciprocating cutter and which is movable over the work to be cut.

The present invention is an improvement in machines broadly of the character of that set forth in my Patent No. 1,492,554, dated May 6, 1924. In that machine there is provided a reciprocating plunger upon which is swiveled a tool holder carrying a cutting tool disposed eccentric to the plunger. A presser foot contacts the material beyond the tool. The presser foot is connected to the tool holder eccentric to the plunger and, in the movement of the machine over the material, trails the tool and holds the latter in proper position to cut along the line of the pattern. The machine of my above patent is of the suspended type, the motor and operating mechanism being carried by a suitably suspended supporting arm. Attention is also directed to my copending application, Serial No. 297,535, filed August 4, 1928. In the machine of that application there is provided a flat base plate of considerable area, which plate slides over the work and supports the motor and operating mechanism for driving the tool.

My present invention is directed to providing a cutting machine employing a reciprocating plunger and a cutting tool disposed coaxially with the plunger, in combination with means for adjusting the cutting tool to compensate for change in direction of movement of the machine, so that the tool will cut accurately on the line of the pattern. A further object of my invention is to provide means whereby the change in direction of movement of the machine is effective to accomplish corresponding change in adjustment of the cutting tool. Further objects and advantages of my invention will appear from the detail description.

In the embodiment of my machine illustrated by way of example, I provide a base 17 in the form of a flat and substantially rectangular plate, the edges of which are rounded upward and outward at 17a. This plate is provided, at its forward end, with a cut-out or recess 18 of substantially V-shape, forming projections 19 which extend forward from the body of the plate.

An electric motor 20 of suitable type is mounted upon the upper face of base plate 17, substantially centrally thereof, the axis of this motor preferably being in the vertical plane of the longitudinal axis of the plate. The motor is secured to the plate in any suitable or preferred manner, conveniently by screws passing through the plate from the under face thereof and screwing into the base of the motor. Current is supplied to motor 20 by means of a suitable cord or cable 21 provided at its free end with a plug member (not shown) for connecting the motor into an electric circuit in a known manner. The cord or cable 10 is connected to the motor through a switch 22 of known type which is controlled by a finger lever 23. This finger lever is adapted and disposed to be operated readily while grasping a member for imparting desired movement to the machine, as will be hereinafter described. I also preferably provide a lamp socket 24 of known type connected by a cord 25 to the cord or cable 21 around switch 22. This socket is adapted to receive a suitable lamp globe (not shown), and carries a hood 26 for reflecting the light downward onto the line of the pattern to facilitate accuracy in cutting of the material according to the pattern. The socket 24 is carried by a bracket 27 mounted on a screw stud (not shown) projecting upward from a boss 28 of the frame supporting the cutting tool operating means. A thumb nut 29 threads upon the stud and cooperates with the upper end of boss 28 for clamping the end of the bracket and holding it in desired position.

Figure 1:
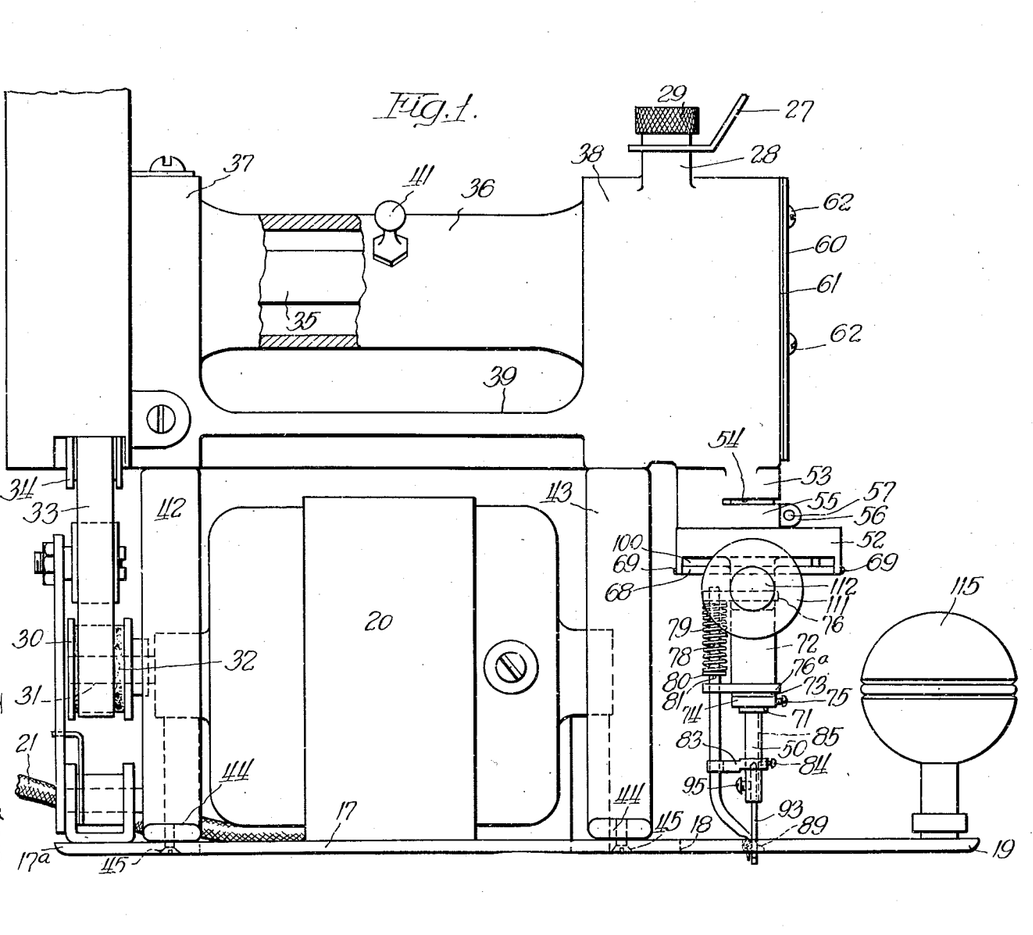
Figure 1 is a side view of a cutting machine constructed in accordance with my invention partly broken away.

A pulley 30 is secured on motor shaft 31, which projects rearward of the motor. The pulley is preferably provided with a covering 32 of cork or other suitable friction material. A fabric belt 33 passes about pulley 30 and about a pulley 34 secured on a drive shaft 35 (Figure 1) which is mounted for rotation in a cylindrical casing 36. This casing is mounted at its ends for turning movement in housings 37 and 38 provided at the ends of a U-shaped frame 39. The casing 36 is held in adjustment by a thumb screw 40 which screws into the housing 38, and a suitable knob or handle 41 is secured to the casing 36 for effecting adjustment thereof. Shaft 35 is disposed eccentric to casing 36 so that by adjusting the latter in the manner described, the shaft is moved toward and away from the work, within limits, so as to adjust the depth to which the cutting tool penetrates the work, as will hereinafter appear. This is disclosed more fully in the co-pending application of Arthur H. Woodward, for Cutting means, filed July 27, 1929, Serial No. 381,524.

The frame 39 is supported by front and back bows 42 and 43, respectively, which are secured to the housing in a suitable manner. These bows are turned outward at their lower ends to provide foot elements 44, which are bored and threaded for reception of securing screws 45 which pass through the base plate 17 from beneath the same, the heads of these screws being countersunk in the under face of the base plate. The bows are disposed adjacent the ends of motor 20 and support the frame 39 above the motor, the axis of casing 36 being in a common vertical plane with the longitudinal axis of the motor 20 and the longitudinal axis of the plate 17. This provides a very compact arrangement in which the weight of the machine is distributed in such manner as to facilitate movement of the plate 17 over the material, the center of gravity being low, assuring ease in manipulation of the machine.

Figure 2:
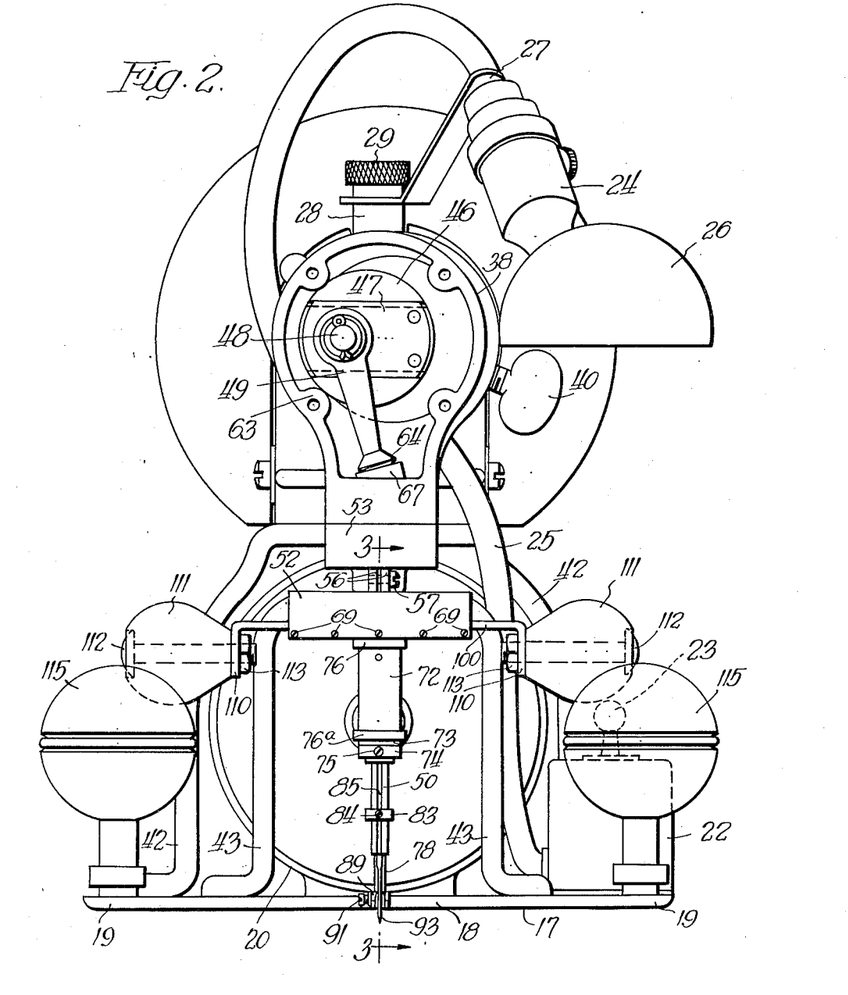
Figure 2 is a front view of the machine, with the cover plate of the housing for the crank pin and associated parts removed.
Figures 3, 4, 5, 6, 7:
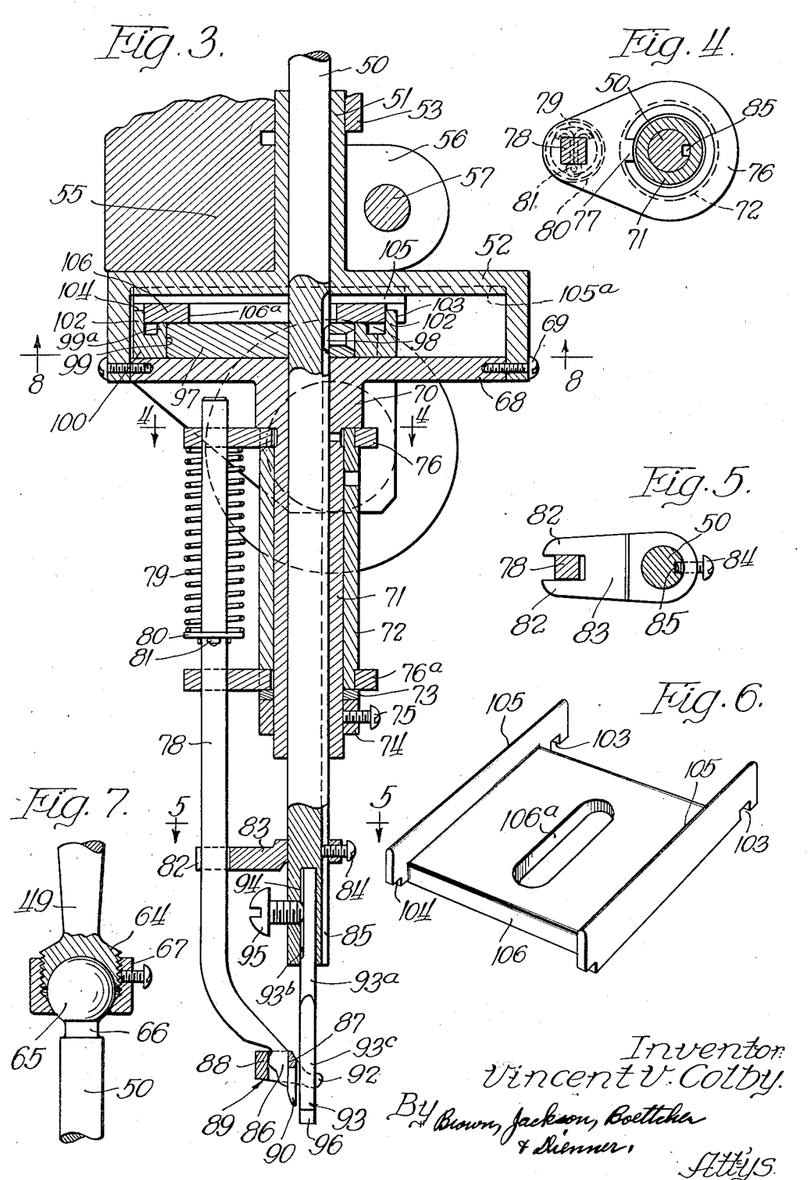
Figure 3 is a section taken substantially on line 3—3 of Figure 2, on an enlarged scale, parts being broken away and shown in section and parts being shown in elevation.
Figure 4 is a section taken substantially on line 4—4 of Figure 3.
Figure 5 is a section taken substantially on line 5—5 of Figure 3.
Figure 6 is a perspective detail view of the guide plate for the operating and guiding member.
Figure 7 is a fragmentary vertical sectional view, on an enlarged scale, of the ball and socket connection between the pitman and the upper end of the plunger.

Shaft 35 extends into housing 38 and is provided at its forward end with a flanged head 46 (Figure 2). A block 47 is supported in the head 46 for movement diametrically thereof and is secured to the head for rotation therewith, in a suitable manner. This block carries a crank pin 48 which is disposed eccentrically to head 46. This pin is connected by a connecting rod 49 to the upper end of a plunger 50 (Figure 3). Plunger 50 is mounted for reciprocation in a neck 51 of a box-like casing 52, disposed at the lower end of a reduced neck 53 depending from housing 38. The neck 53 is suitably slotted, at 54 and adjacent its lower end, to provide a clamping collar 55 having forwardly projecting ears 56 which cooperate with a screw 57 for clamping the collar tightly about neck 51 of casing 52. This provides simple and efficient means for securing casing 52 to neck 53 of casing 38, though casing 52 may be secured in position in any other suitable or preferred manner. If desired, a suitable packing may be provided within the casing 38 above neck 51, and about the plunger 50, to prevent escape of lubricant about neck 51 and plunger 50. The housing 38 is intended to receive and retain a suitable lubricant, such as a light grease, and is normally closed by a plate 60 and a gasket 61, secured to the front of the housing by screws 62 passing through the plate and the gasket and threading into suitable lugs 63 projecting inward from the sides of the housing.

Connecting rod 49 is provided at its lower end with a head 64 defining a hemispherical socket which receives the upper portion of a ball 65 formed integrally with plunger 50, and connected to the upper end thereof by a reduced neck 66. Head 64 is exteriorly threaded for reception of an interiorly threaded collar 67 which is shaped interiorly to fit about the lower portion of ball 65, this collar being provided with an opening about the neck 66 of ample diameter to accommodate movement of the lower end of connecting rod 49 relative to the plunger. Collar 67 is so adjusted as to prevent any objectionable looseness between the ball and the socket members of the joint while avoiding binding between these elements. In this manner, the plunger is connected to the rod 49 to be reciprocated thereby during rotation of shaft 35, and is free for rotation on its axis.

Figure 8:
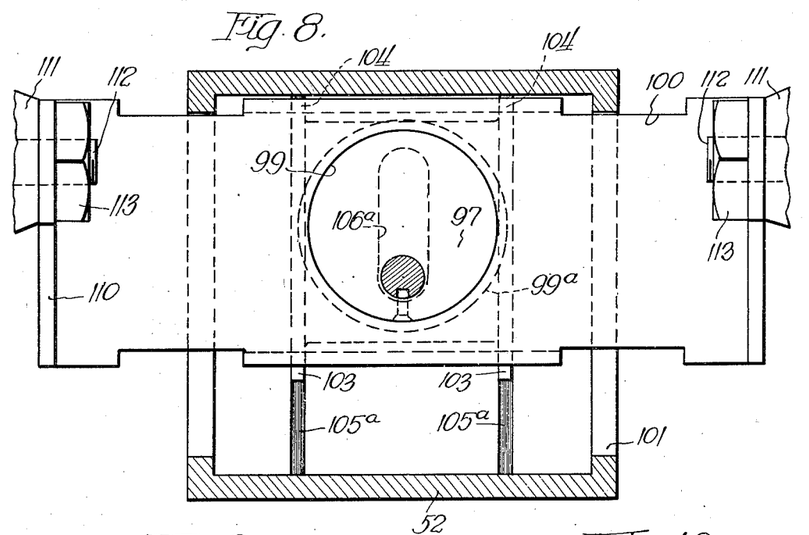
Figure 8 is a section taken substantially on line 8—8 of Figure 3.

Casing 52 is of rectangular shape in plan (Figure 8) and is closed by a rectangular bottom plate 68 suitably secured in the lower end of the casing, as by means of screws 69. Plate 68 is provided with a depending collar 70 disposed coaxial with sleeve 51, from which collar depends a concentric neck 71 through which the plunger 50 is slidably mounted. Necks 51 and 71 cooperate to support and guide the plunger 50 during vertical reciprocation thereof. A sleeve 72 is mounted for turning movement on neck 71, this sleeve being confined between collar 70 and a washer 73 confined between the lower end of the sleeve and a collar 74 secured by a set screw 75 on the neck 71 adjacent the lower end thereof. The upper portion of sleeve 72 is slightly reduced to provide a shoulder upon which seats an arm 76 which is provided with a key element 77 (Figure 4) which extends into a corresponding slot in the sleeve 72 and serves to secure the sleeve and the arm 76 against relative movement. A lower arm 76a is mounted upon the lower end of sleeve 72 in the same manner as the arm 76 is mounted, these two arms being aligned lengthwise of sleeve 72 and projecting beyond the latter at one side thereof.

A presser rod 78, of rectangular cross-section, is slidably mounted through the arms 76 and 76a for vertical movement. This rod is urged downward by a compression coil spring 79 disposed about the rod and confined between arm 76 and a washer 80 mounted about rod 78 above arm 76a, this washer being held against downward movement relative to the rod by a cotter pin 81. Presser rod 78 also extends through a slot 82 in the outer end of an arm 83 secured to plunger 50, adjacent the lower end thereof, by means of a set screw 84 which engages into a keyway 85 provided in the plunger for a purpose to be presently described. Arm 83 is thus secured to the plunger so as to be held against turning movement relative thereto, and the presser rod 78 and sleeve 72 will thus partake of the turning movement of the plunger 50.

Presser rod 78 is provided, at its lower end, with a depending finger 86 which fits snugly between a web element 87 and bight portion 88 of a foot member 89 of substantially U-shape in plan. A point element 90 extends downward from finger 86 and abuts the lower edge of web 87, foot member 89 being secured to the finger 86 by a set screw 91, or in any other suitable or preferred manner. The foot member 89 is provided with toe elements 92 disposed to bear upon the material being cut at opposite sides of and adjacent a cutting tool 93 provided with a shank 93a flattened at one side at 93b, this shank extending into a socket bored in the plunger 50 from the lower end thereof. A set screw 95 screws into the lower portion of plunger 50 and contacts the flattened surface 93b of the shank of the tool for securing the latter in socket 94, in predetermined relation to the plunger 50 and with the upper end of shank 93a in contact with the plunger at the upper end of the socket. Lower portion 93c of the tool is flattened and the lower end of the tool is beveled from opposite sides to provide a cutting edge 96. The beveling of the tool, at its lower end and from opposite sides thereof, is shown in Figure 2. The tool is so mounted in the plunger that the flattened portion 93c thereof extends in parallelism with arm 83 and the toes 92 of the foot member 89.

An eccentric 97 is disposed about plunger 50 and is connected to the latter by a key member 98 which projects into keyway 85. This eccentric rests upon the upper face of bottom plate 68a of casing 52 and fits snugly within a circular opening 99 in an operating and guide member in the form of an elongated rectangular plate 100 which extends through slots 101 in the sides of casing 52. Plate 100 is provided, at the central portion thereof, with lateral upwardly projecting flanges 102. These flanges engage into notches 103 and 104 in the lower edges of flanges 105 which project upward from the sides of a rectangular guide plate 106 disposed above eccentric 97 and plate 100. Flanges 105 engage into grooves 106 formed in the under face of the top plate of casing 52 and extending from front to back of the casing, at right angles to flanges 102 of plate 100. Plate 106 is thus mounted for sliding movement from front to back of the casing 52 and plate 100 is mounted for sliding movement transversely of the casing while also being movable with plate 106. In this manner plate 100 is mounted for universal movement in the plane of the casing 52, it being noted that plate 106 is provided with a slot 106a disposed midway between and parallel with ribs 105, this slot accommodating the plunger 50 in the movement of the plate. Conveniently, plate 100 is provided with an upwardly extending short collar 99a defining, in part, the circular opening 99 for the eccentric 97.

Plate 100 is provided, at each end thereof, with a depending flange 110. Suitable knobs 111 are secured to these flanges in any suitable manner, as by means of screws 112 passing through the knobs and the flanges, and nuts 113 threading onto these screws. Preferably, the knobs are aligned lengthwise of plate 100 and are disposed on a line eccentric to the axis of plunger 50, and preferably intersecting the outer portion of the eccentric when the plate 100 is disposed in either its extreme forward or its extreme rearward position in the casing 52. This particular disposition of the knobs 111, while preferred, is not essential.

The plate 100 and associated parts provide means for moving the machine over the work and for adjusting the blade of the cutting tool so as to maintain it in parallelism with the line of the pattern, incident to changes in direction of movement of the machine over the work, assuring ease and accuracy in the cutting operation. The manner in which adjustment of the cutting tool is effected by change in direction of the movement of the machine over the work is illustrated diagrammatically in Figures 9 to 12, inclusive.

Figure 9:
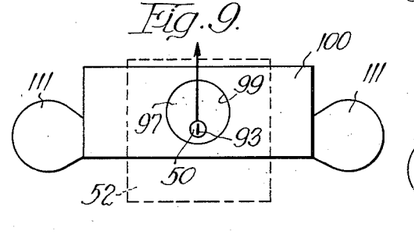
Figures 9, 10, 11 and 12 are diagrammatic views illustrating the manner in which the cutting tool is adjusted in accordance with changes in direction of movement of the machine over the work.
Figure 10:
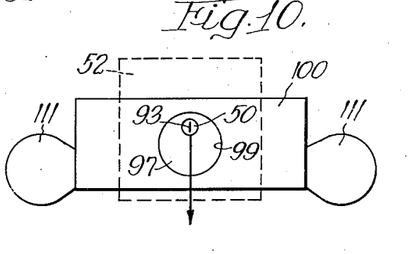
Figure 11:
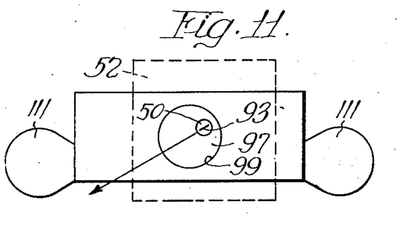
Figure 12:
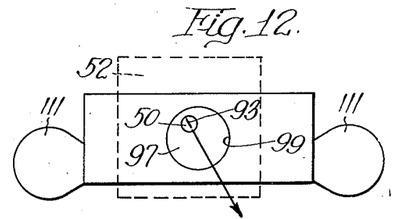
Figure 13:
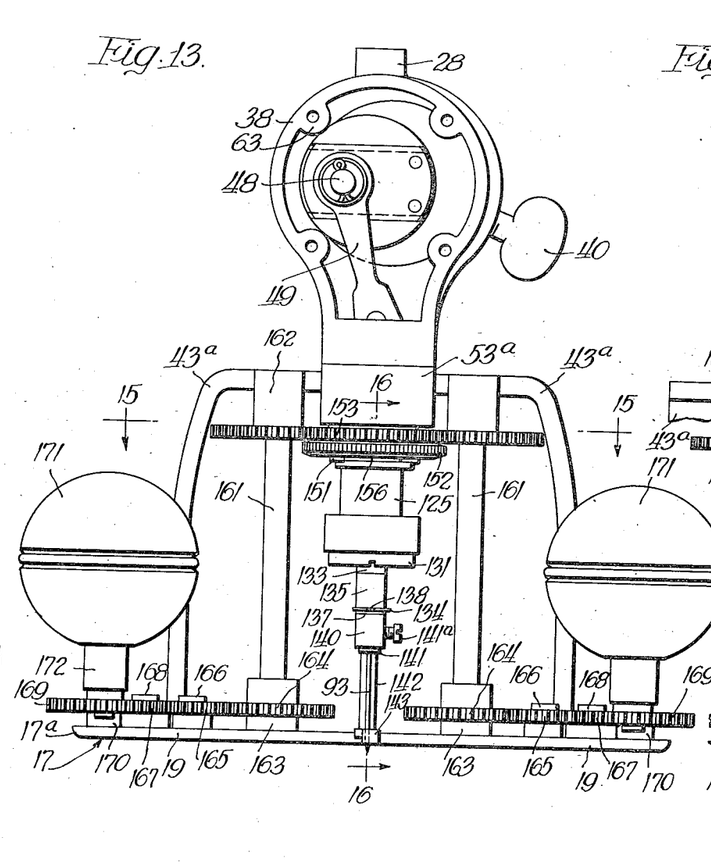
Figure 13 is a front view of a modified form of cutting machine embodying my invention, the cover plate of the housing for the crank pin and associated parts being removed.
Figure 14:
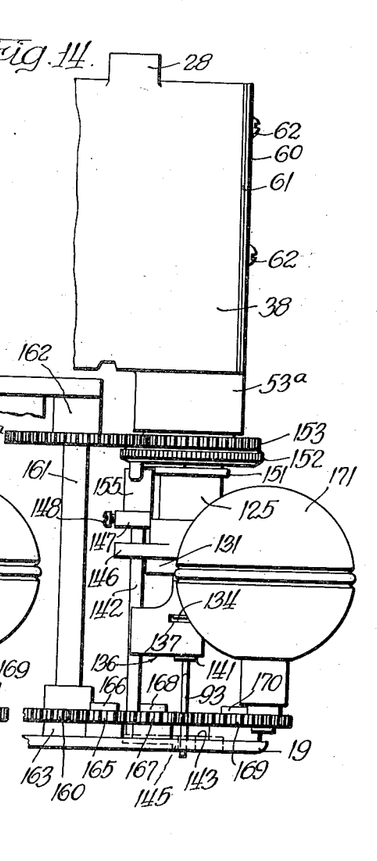
Figure 14 is a fragmentary side view of the machine illustrated in Figure 13.

In Figure 9 it is assumed that the machine is being moved away from the operator in the direction indicated by the arrow, this movement being in a line parallel to the longitudinal axis of the base plate 17. In order to move the machine in this direction, pressure is exerted upon the knobs 111, this pressure resulting in disposing the plate 100 in its rearmost position in casing 52 so that eccentric 97 is disposed as shown in Figure 9. With the eccentric in this position, the cutting edge of tool 93 is disposed parallel with the direction of movement of the machine and in the plane of the longitudinal axis of base plate 1. It will thus be seen that when the machine is moved in the direction referred to, tool 93 is adjusted by plate 100 and incident to change in direction of movement of the machine, so as to follow accurately the line along which the machine is moved, the tool being in parallelism with the line to be cut. If now the machine is moved forward, in the direction of the arrow in Figure 10, eccentric 97 is swung about the axis of plunger 50 from its rearward position of Figure 9 into its forward position of Figure 10. This turns the plunger through an arc of 180° so that the tool is again disposed with its cutting edge parallel to the plane of the longitudinal axis of the base plate of the machine, for cutting along a straight line in the plane of this axis. In order to move the machine laterally, plate 100 is moved in the direction in which it is desired to move the machine, this movement of the plate resulting in turning movement of eccentric 97 and plunger 50 to an extent corresponding to the extent of change in direction of the movement of the machine. Accordingly, the cutting tool is adjusted so that its cutting edge is parallel to the line along which the machine is moved. In Figure 11, the machine is considered as being moved toward the left, as indicated by the arrow. If it is desired to move the machine toward the right so as to change its direction of movement from that of Figure 11 to that indicated by the arrow of Figure 12, this is accomplished through pressure applied in the proper direction, toward the right, to plate 100, by means of the knobs 111. This results in swinging the eccentric 97 toward the right so as to dispose the cutting edge of the tool in parallelism with the line along which the cut is to be made. It will be observed that in all instances the blade of the tool is coincident with a line which passes through the axis of the plunger 50 and through the point of the eccentric nearest to the plunger and the point of the eccentric most remote from the plunger. This follows from the fact that the eccentric is keyed to the plunger and the pressure to which plate 100 is subjected in changing the direction of movement of the machine over the work, is transmitted to the eccentric in a direction toward the plunger, so that the eccentric and the plunger swing on the axis of the latter into such position that the pressure at opposite sides of the eccentric is equalized, that is, until the axis of the plunger is on dead center with the point of the eccentric nearest to the plunger and the point of the eccentric most remote from the plunger. In this manner, I provide means for adjusting the cutting tool so as to cut along the line of the pattern, this adjustment of the tool being at all times under control of the operator. The adjustment of the cutting tool is incident to change in direction of the movement of the machine, and, to this extent, is automatic, which facilitates the cutting operation.

If desired knobs 115 may be suitably secured to the projections 19 of base plate 17. The machine may be moved over the work by the knobs 115, in desired directions, and the plate 100 may be adjusted for adjusting the tool to cut along the line of the pattern. In this connection, it will be noted that knobs 111 are disposed adjacent knobs 115 and may be grasped by the thumb and forefinger of the hand without releasing the knobs 115, for accomplishing the desired movements of plate 100. If desired, when knobs 115 are provided, knobs 111 may be omitted, in which case flanges 110 of plate 100 would provide means for operating this plate with facility while gripping the knobs 115. Ordinarily, the machine is moved over the work by means of the knobs 111 and associated parts, in the manner previously described, though in certain instances the provision of knobs 115 is advantageous, as when the pattern to be cut is small and intricate, comprising short turns or sharp angles. For this reason, the provision of knobs 115 is preferred, and these knobs may be used or not, as conditions require.

The foot member 89 trails the tool, when the machine is being moved, and the point 90 extends into the cut made by the tool, this point serving to steady the pressure bar and foot and to assure that the latter follows the tool accurately. The provision of the point 90 is not essential in all cases, and this point may be omitted, if desired.

Since the cutting tool 93 is disposed coaxially with the plunger 50, preferably with the upper end of its shank in contact with the plunger at the upper end of socket 94, the pressure and impact to which the cutting tool is subjected, in use, is transmitted directly to the plunger axially thereof. This is advantageous in that it avoids subjecting the plunger to transverse stresses and eliminates wear between the plunger and the tool holder, such as is apt to occur in machines in which a tool holder is swiveled on the plunger and the tool is mounted in the holder eccentric to the plunger.

In the modified form of my invention illustrated in Figures 13 to 16, inclusive, a ferrule 120 is suitably secured, as by means of a set screw 121, in depending portion 53a of housing 38. This ferrule is provided at its lower end with a shoulder 122 which contacts the lower end of member 53a, and with a conical bearing element 123 extending downward and inward from this shoulder to a tubular neck 124 constituting an extension of the ferrule. A sleeve 125 is mounted for turning movement on neck 124 and is provided in its upper end with a depression forming a raceway for bearing balls 126 confined between the upper end of the sleeve and conical bearing element 123. At its lower end the sleeve is provided with a recess defining a raceway for bearing balls 127 confined between the lower end of the sleeve and a cone bearing member 128 which fits upon neck 124 and is provided with a key 129 extending into a keyway 130 in the lower end of neck 124, for locking member 128 to the neck. A retaining ring 131 screws onto the lower end of neck 124 and contacts the underface of sleeve 125, this ring being provided, in its upper face, with an annular groove which receives the lower portion of a collar 132 set into the lower end of the sleeve and extending around the cone bearing member 128. This provides a seal for the ball bearing at the lower end of the sleeve, and this sleeve is mounted on ball bearings for turning movement about neck 124, which neck, since it is an extension of the ferrule 120, is secured against movement.

Plunger 50a is slidably mounted in ferrule 120 and neck 124 for vertical reciprocation, the upper end of this plunger being connected to the lower end of connecting rod 49 by a pivotal connection, in a known manner. Plunger 50a is provided, adjacent its lower end, with a collar 133, the portion of the plunger below this collar being reduced to provide a stud 134. This stud passes through upper arm 135 of a yoke 136. Arm 135 is held against movement lengthwise of stud 134, by the shoulder 133 and a suitable washer 137 of known type, this washer being approximately U-shaped in plan and fitting snugly in a groove 138 formed in stud 134 at the lower end thereof, the washer being resilient and held in the groove by spring action in a known manner. Yoke 136 is thus mounted upon stud 134 for turning movement on the axis of plunger 50a.

Lower arm 140 of yoke 136 is suitably bored for reception of a slotted socket member 141 which receives the shank of the cutting tool 93. A set screw 142 passes through arm 140 and socket member 141 and serves to secure the shank of the tool in the socket member.

Yoke 136 projects from stud 134 radially thereof and is provided with a vertical slot which receives a presser rod 142. A presser foot 143 is fixedly secured to the lower end of rod 142 and extends adjacent and parallel to tool 93, this foot having a recess 144 formed therein which accommodates the blade of the tool. Foot 143 is offset downward at 145 so as to bear upon the work adjacent the cutting tool.

Rod 142 is slidably mounted through an arm 146 extending from sleeve 124 at the lower end and radially thereof. A block 147 is secured upon rod 142, conveniently by a set screw 148. The inner side of this block is flat and contacts a flattened surface 149 formed upon sleeve 125, adjacent the lower end thereof, this surface cooperating with the block 147 to hold rod 142 against turning movement relative to sleeve 125. An expansion coil spring 150 is mounted about rod 142 and confined between block 147 and a locking member 151 disposed at the underface of an annular flange 152, extending about sleeve 125 adjacent the upper end thereof. A spur gear 153 is disposed above the upper end of sleeve 125 coaxially therewith, this gear being suitably secured to flange 152, as by rivets 154. Flange 152 and gear 153 are provided with aligned bores 152a and 153a, respectively, which accommodate the upward movement of rod 142, the upper end of which fits into bore 152a when the pressure foot 143 is in operative position. Preferably, a tubular guard 155 is disposed about the spring 150. The presser rod 142 and associated parts are thus mounted for turning movement with yoke 136 and the cutting tool 93 on the axis of plunger 50a.

Locking member 151 is in the form of a fork which engages into a groove 156 defined by flange 152 and shoulder 157 of sleeve 125. Rod 142 is provided with a notch 158 disposed to receive an edge of member 151 at the opening through the latter which accommodates rod 142, when the rod is raised so as to elevate the presser foot 143 to inoperative position, member 151 being turned slightly about sleeve 125 so as to engage into the notch 158. This provides simple and efficient means for holding the pressure foot out of contact with the work, which is desirable under certain conditions. Any other suitable or preferred means for holding the pressure foot in inoperative position may be employed.

Figure 15:
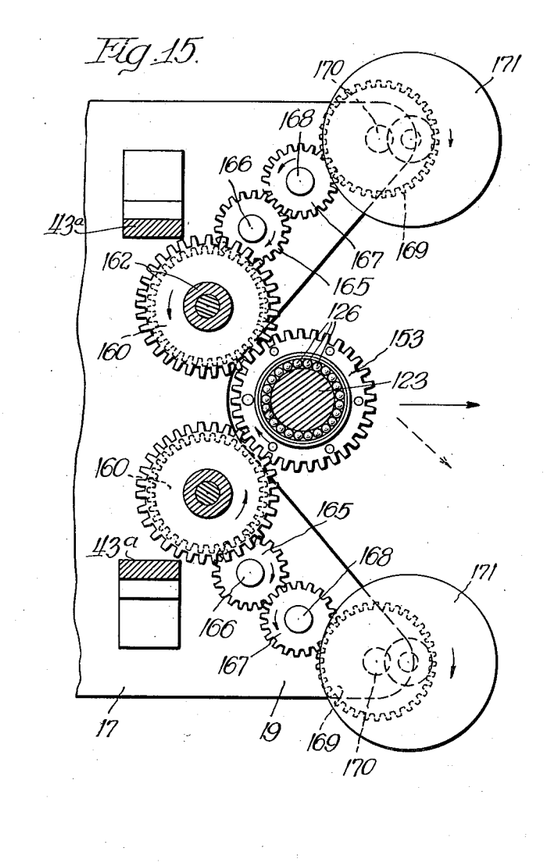
Figure 15 is a section taken substantially on line 15—15 of Figure 13.
Figure 16:
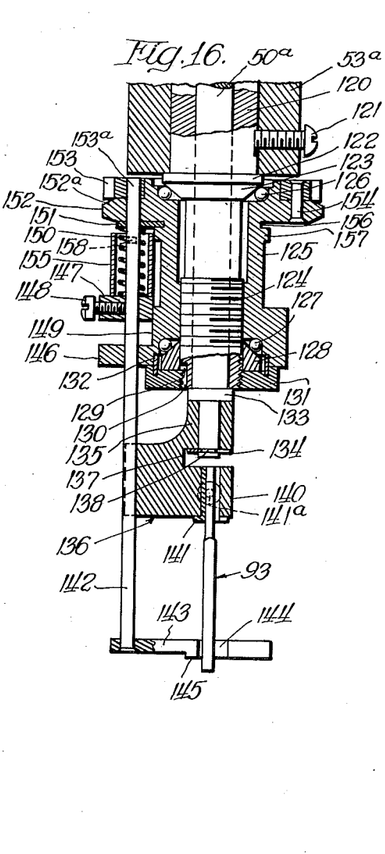
Figure 16 is a section taken substantially on line 16—16 of Figure 13, on an enlarged scale, parts being shown in elevation and parts being broken away.

Gear 153 meshes with two spur gears 160 disposed in rear of and at opposite sides of plunger 50a. Spur gears 160 are secured upon vertical shafts 161 rotatably mounted in bearing members 162 and 163 suitably supported by bow 43a and base plate 17, respectively. Spur gears 164 are secured upon shaft 161, adjacent the lower ends thereof, and mesh with pinions 165 suitably mounted for rotation on studs 166 secured in extensions 19 of base plate 17. Pinions 165 mesh with pinions 167 likewise mounted for rotation on studs 168, and pinions 167 mesh with spur gears 169 mounted for rotation on studs 170 suitably secured in extensions 19 at the forward ends thereof. Knobs 171 are suitably secured upon studs 172, which studs are mounted upon the gears 169 eccentrically thereof and are fixed thereto. By grasping the knobs 171 the machine may be moved over the work in the desired direction. In order to change the direction of movement of the machine it is necessary to exert pressure upon the knobs 171 in the direction toward which it is desired to move the machine, and this in turn serves to rotate sleeve 125 so as to turn the cutting tool 93, through the medium of pressure rod 142 and yoke 136, into such position that the cutting edge of the tool is parallel with the line of the pattern along which the machine is moved. This will be clear from Figure 15, in which it is assumed that the machine is being moved forward parallel to the longitudinal axis of the base plate 17. If it be desired to move the machine toward the left, as viewed in Figure 15, in order to follow the line of the pattern, this is accomplished by exerting the requisite pressure upon the knobs 151 toward the left. This serves to change the direction of movement of the machine and also serves, through the trains of gearing disclosed, to impart corresponding turning movement to the yoke 136. In Figure 15 the arrows indicate the direction in which the respective gears and pinions are turned, and the resulting turning movement imparted to gear 153 and, consequently, to yoke 136. Since the studs 172, which carry the knobs 171, are fixed to the gears 169, the extent to which gear 153 is turned, when changing the direction of movement of the machine, may be readily controlled by the operator. In fact, the turning movement of the gears 169 will correspond closely to the angle of change in direction of movement of the machine, so that the correct adjustment of the cutting tool in accordance with the change in direction of the machine is substantially automatic and no difficulty is experienced in fixing the correct adjustment of the tool. In this connection, I contemplate so proportioning the gears and pinions of the gear trains that the turning movement imparted to yoke 136 will correspond to the angle of change in direction of movement of the machine. If desired, the knobs 171 may be secured to the gears 169 coaxially therewith, in which case the desired turning of the gears 169 would be effected by turning of the knobs 171 on their axes. I also contemplate having the studs 172 pivotally connected to the gears 169 for turning movement relative thereto, if desired.

The operation of the modified form of my machine illustrated in Figures 13 to 16, inclusive, is, in general, similar to that of the machine illustrated in Figures 1 to 12, inclusive, and it need not be described in greater detail.

As previously indicated, my invention is applicable to machines of the suspended type disclosed in my above identified patent, or to machines of the type disclosed in my copending application, above identified, in which the motor and operating mechanism are supported by a flat base plate slidable over the work.

While the cutting tool illustrated, by way of example, is in the form of a chisel blade, any other suitable bladed cutting tool may be employed.

As above indicated, and as will be understood by those skilled in the art, changes in construction and arrangement of parts of my invention may be resorted to without departing from the field and scope of the same, and I intend to include all such variations, as fall within the scope of the appended claims, in this application in which the preferred forms only of my invention are disclosed.

What I claim is:

1. In combination in a cutting machine, a base member adapted to rest upon and slide in any direction over the work, a reciprocating plunger, a tool receiving member swiveled on the plunger for turning movement on the axis thereof, means for securing a cutting tool to said member coaxially with said plunger, a knob carried by the base member for moving the latter over the work, and connections between said knob and said tool receiving member for turning the latter.

2. In combination in a cutting machine, a base member adapted to rest upon and slide in any direction over the work, a reciprocating plunger, a tool receiving member swiveled on the plunger for turning movement on the axis thereof, means for securing a cutting tool to said member coaxially with said plunger, a member rotatably mounted on the base member, a knob attached to said rotatable member eccentrically thereof, and connections between said rotatable member and said tool receiving member for turning the latter.

3. In combination in a cutting machine, a base member adapted to rest upon and slide in any direction over the work, a reciprocating plunger, a tool receiving member swiveled on the plunger for turning movement on the axis thereof, means for securing a cutting tool to said member coaxially with said plunger, a sleeve mounted for rotation on the plunger axis and connected to said tool receiving member for turning the latter, a knob carried by the base member for moving the latter over the work, and gear connections between said knob and said sleeve for turning the latter.

4. In combination in a cutting machine, a base member adapted to rest upon and slide in any direction over the work, a reciprocating plunger, a tool receiving member swiveled on the plunger for turning movement on the axis thereof, means for securing a cutting tool to said member coaxially with said plunger, knobs carried by the base member and disposed at opposite sides of the plunger, and gear trains connecting said knobs to said sleeve for turning the latter in accordance with changes in direction of movement of said base member.

5. In combination in a cutting machine, a base member of sufficient extent to support the cutting means and the operating mechanism therefor, said base member having a smooth planar under surface of sufficient extent to support the weight of the parts carried thereby and to assure sliding of said base member in any direction upon and over the material being cut, a motor mounted upon said base member, a reciprocating plunger, driving connections between said motor and said plunger, a cutting tool attached to said plunger coaxially and for reciprocation therewith, said tool being turnable on the axis of said plunger and relative to said base member, a handle connected to said base member for moving the latter in desired direction over the material and confined against turning movement about the axis of said plunger, said handle being movable relative to said base member incident to change in direction of movement of the latter, and connections between said handle and said tool effective for turning the latter in accordance with and incident to change in direction of movement of said base member.

6. In combination in a cutting machine, a support adapted to bear upon and for movement over the work in any direction, a reciprocating plunger turnable on its axis, a cutting tool secured to said plunger coaxially therewith, an eccentric connected to the plunger for imparting turning movement thereto, and a member fitting about the eccentric and slidable in a plane normal to the axis of said plunger.

7. In combination in a cutting machine, a support movable over the work in any direction substantially parallel thereto, a casing carried by the support, a reciprocating plunger extending through said casing, said plunger being turnable on its axis, a cutting tool secured to said plunger coaxially therewith, an eccentric within said casing and connected to the plunger for imparting turning movement thereto, and an operating member slidable in the casing and fitting about the eccentric.

8. In combination in a cutting machine, a support movable over the work in any direction substantially parallel thereto, a casing carried by the support, a reciprocating plunger extending through said casing, said plunger being turnable on its axis, a cutting tool secured to said plunger coaxially therewith, an eccentric within said casing and connected to the plunger for imparting turning movement thereto, a guide plate within the casing and connected thereto for rectilineal sliding movement, and an operating member slidably mounted in the casing and connected to said plate for relative rectilineal sliding movement perpendicular to the movement of the plate, said member fitting about said eccentric.

9. In combination in a cutting machine, a base having a smooth planar under surface of considerable extent and adapted to seat flat upon and slide in any direction over material being cut, a casing carried by the base, a reciprocating plunger extending through said casing, said plunger being turnable on its axis, a cutting tool secured to said plunger coaxially therewith, an eccentric within said casing and connected to the plunger for imparting turning movement thereto, a guide plate within the casing and connected thereto for rectilineal sliding movement fore and aft of said base, and an operating member slidable in the casing and fitting about said eccentric, said member being slidably connected to said plate for rectilineal movement transversely of the base.

VINCENT V. COLBY.